Feb. 16, 1926.　　　　　　　　　　　　　　　　　　　1,573,120
B. S. PENLEY
SHEET PRODUCING AND STACKING APPARATUS
Filed June 29, 1925　　　　8 Sheets-Sheet 1
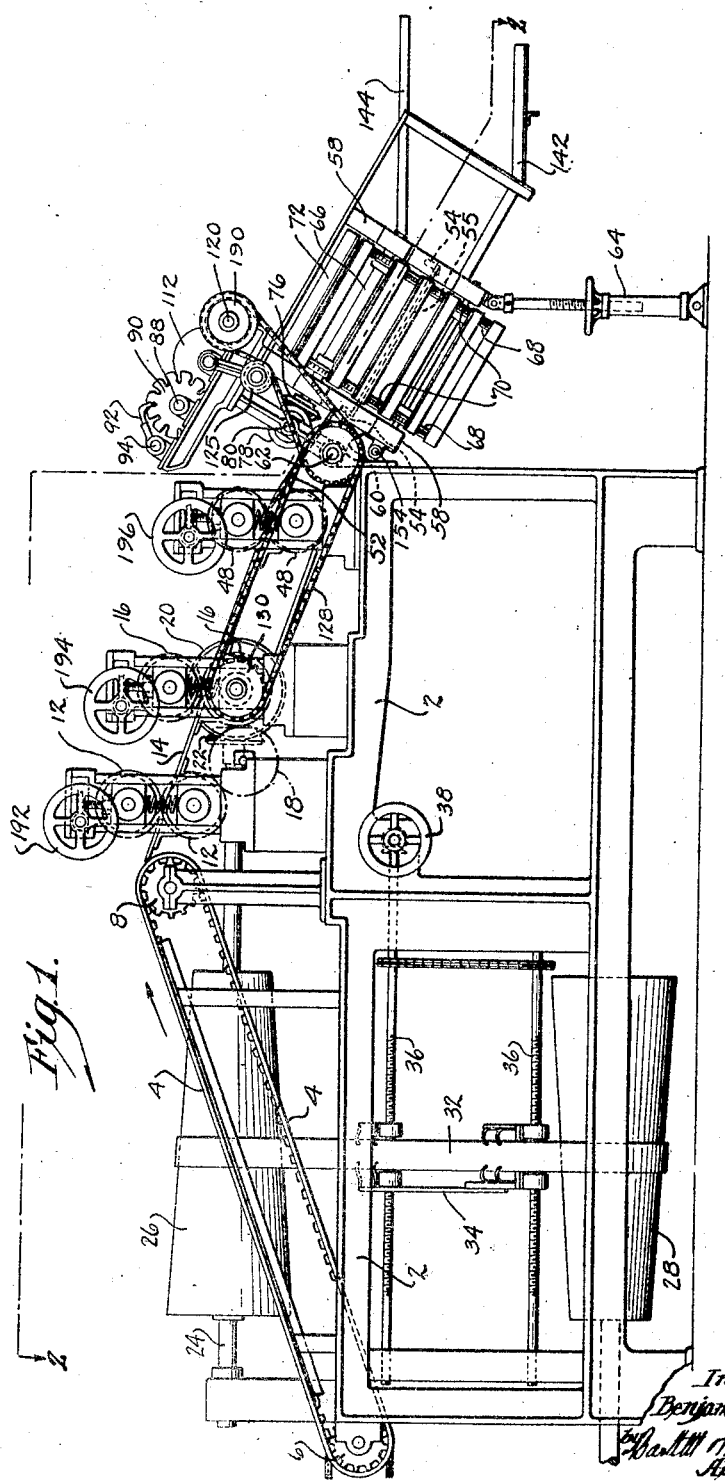

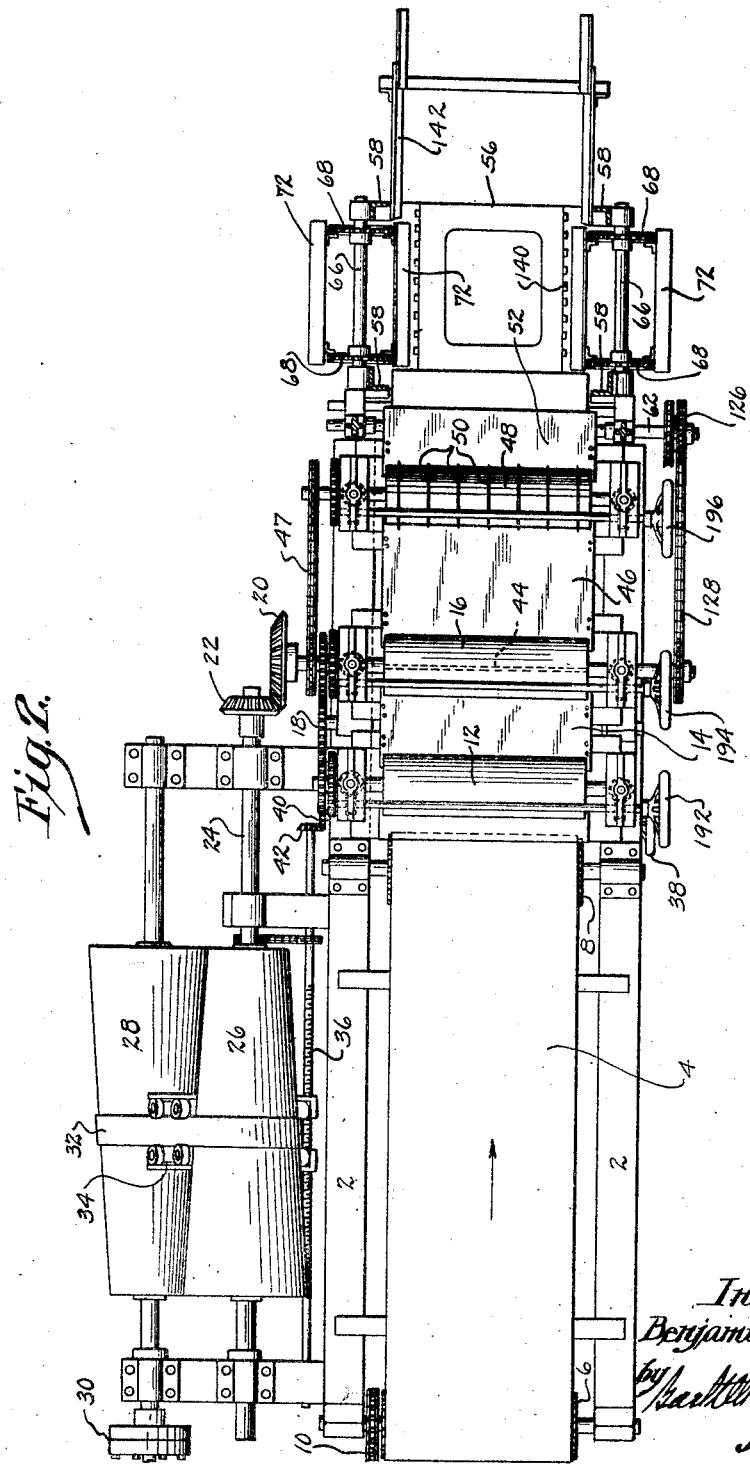

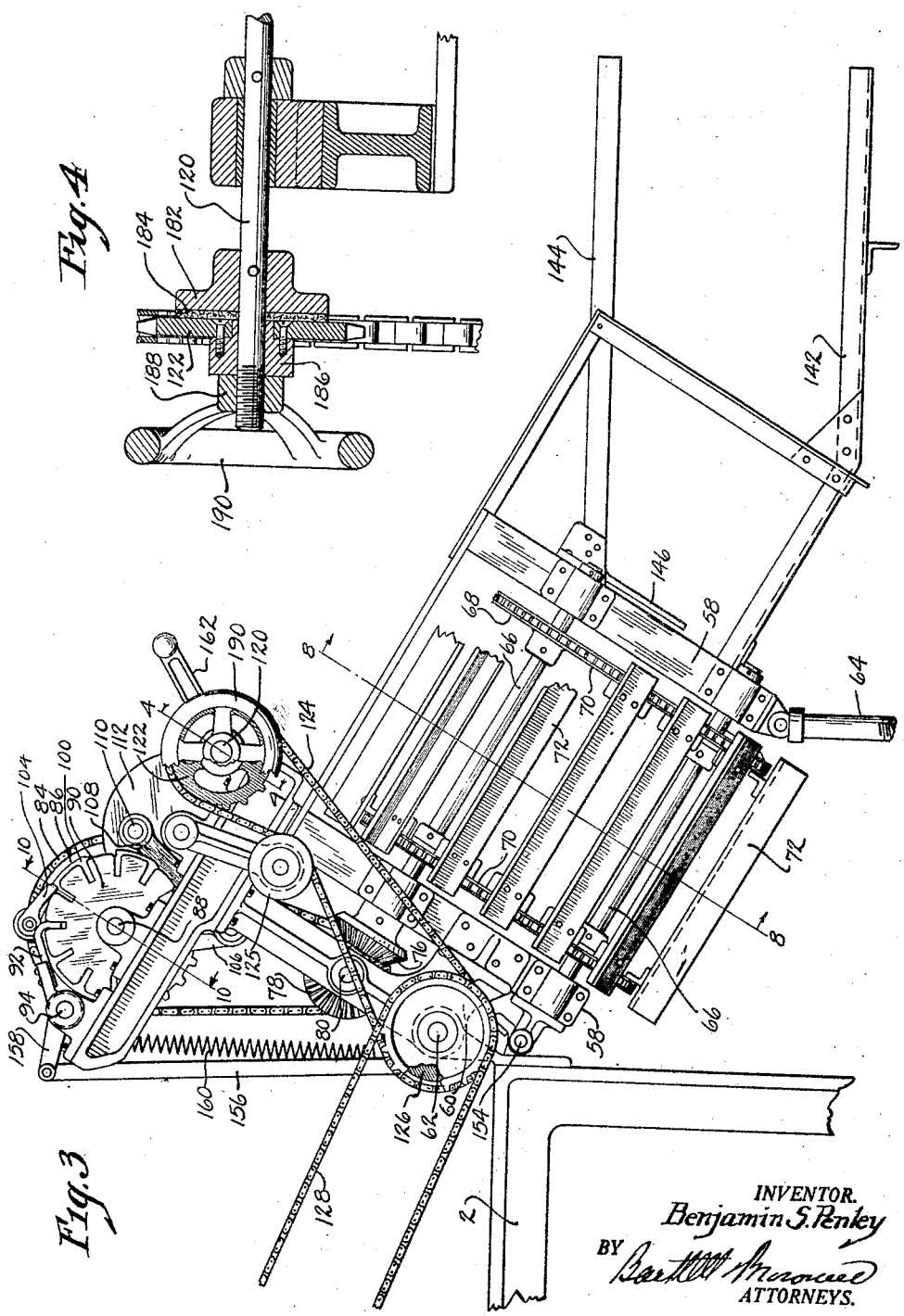

Feb. 16, 1926.

B. S. PENLEY 1,573,120

SHEET PRODUCING AND STACKING APPARATUS

Filed June 29, 1925    8 Sheets-Sheet 4

INVENTOR.
Benjamin S. Penley
BY
ATTORNEYS.

Fig. 8
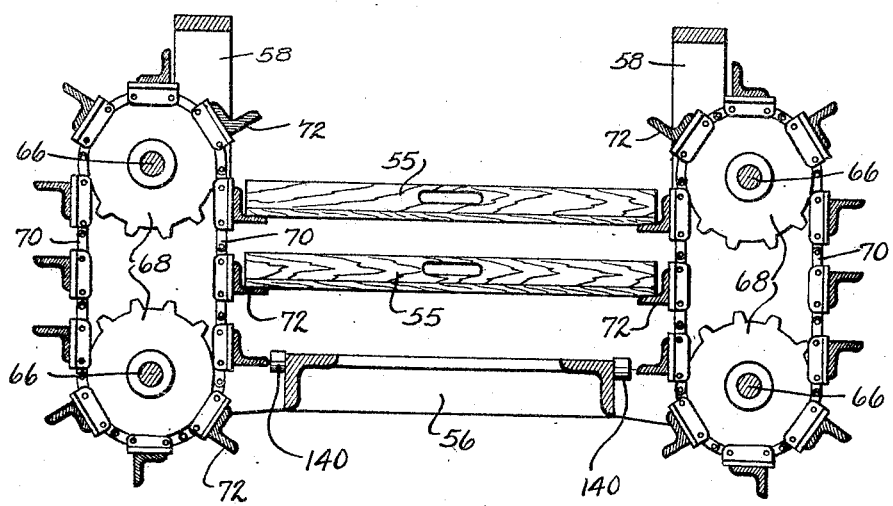
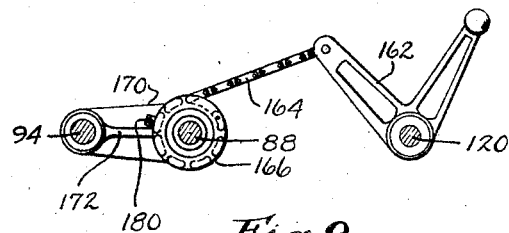
Fig. 9

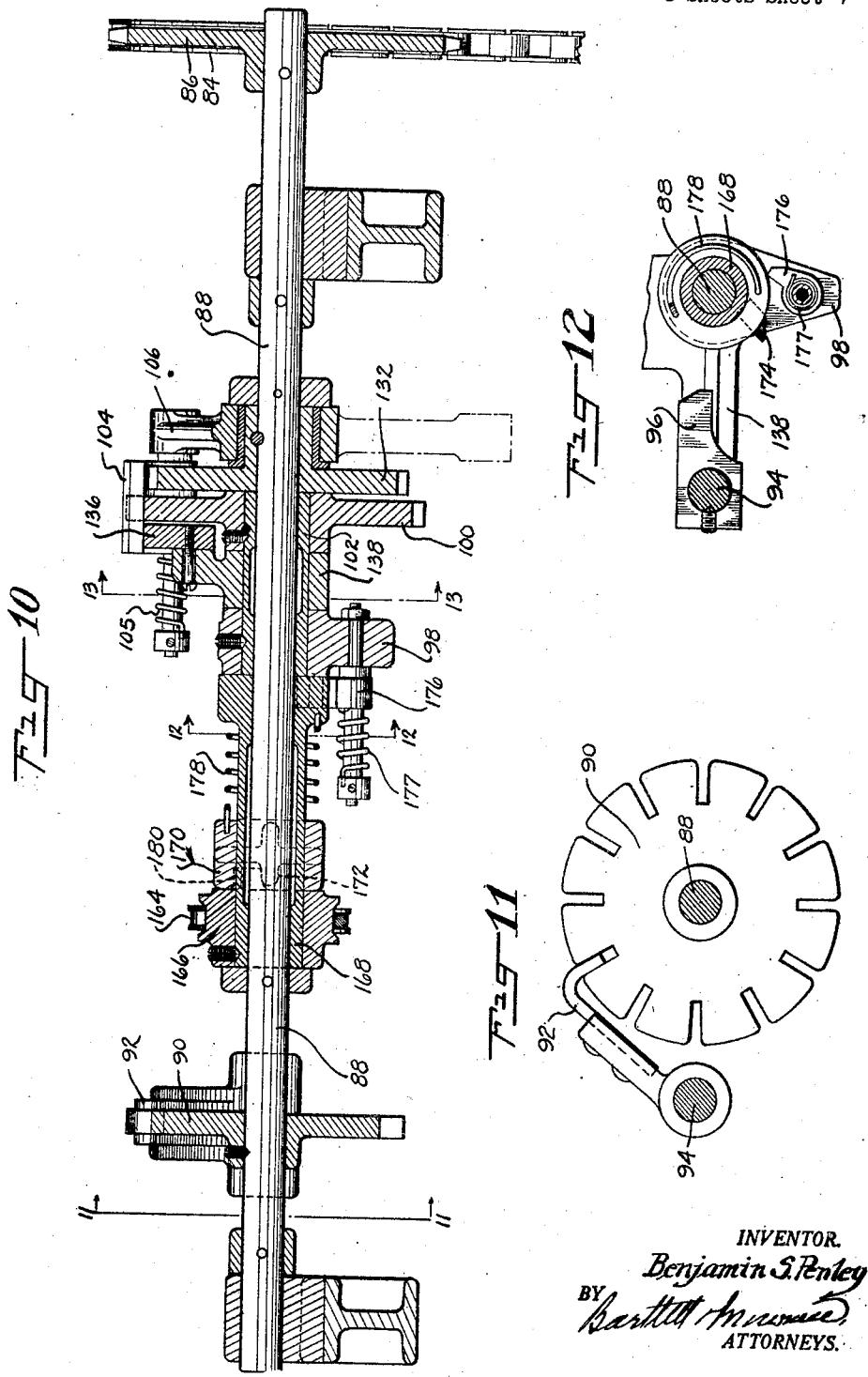

Feb. 16, 1926.
B. S. PENLEY
1,573,120
SHEET PRODUCING AND STACKING APPARATUS
Filed June 29, 1925
8 Sheets-Sheet 8
Fig.13
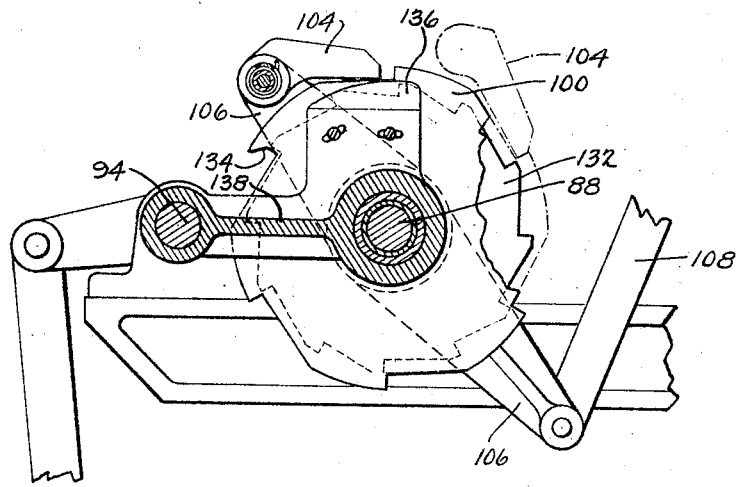
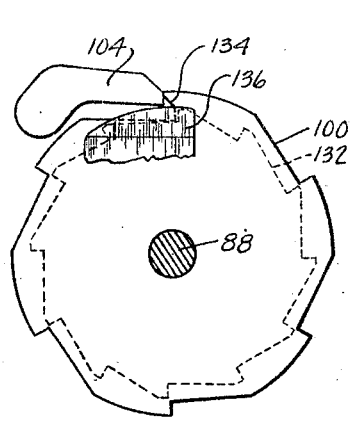
Fig.14
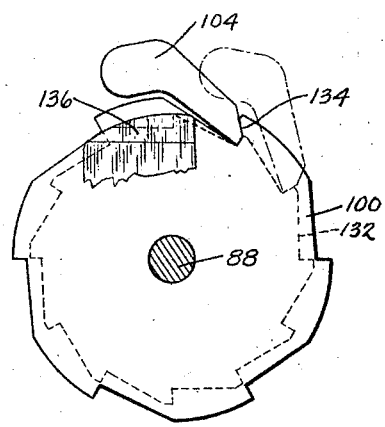
Fig.15
INVENTOR.
Benjamin S. Penley
BY
ATTORNEYS.

Patented Feb. 16, 1926.

1,573,120

UNITED STATES PATENT OFFICE.

BENJAMIN S. PENLEY, OF PHILADELPHIA, PENNSYLVANIA, ASSIGNOR TO BEECH-NUT PACKING COMPANY, OF CANAJOHARIE, NEW YORK, A CORPORATION OF NEW YORK.

SHEET PRODUCING AND STACKING APPARATUS.

Application filed June 29, 1925. Serial No. 40,189.

*To all whom it may concern:*

Be it known that I, BENJAMIN S. PENLEY, a citizen of the United States, residing at Philadelphia, county of Philadelphia, State of Pennsylvania, have invented a certain new and useful Improvement in Sheet Producing and Stacking Apparatus, of which the following is a full, clear, and exact description.

My invention relates to a new and improved sheet producing and stacking apparatus for a machine delivering a series of severed sheets and stacking the same and has for its object the securing of greater speed and more accurate stacking than is possible with apparatus heretofore used. It further has for its object to produce a stacking device in which friction is usefully employed in slowing up and stopping the sheets in a receiving tray. It further has for its object to provide a stacking device in which the stacks are received in one of a series of trays, the active receiving tray being removed from receiving position and an empty tray substituted automatically at predetermined intervals. It further has for its object to provide manually controlled means to advance the change of trays. It further has for its object to provide novel adjustment and to secure other novel and advantageous results hereinafter referred to.

While my invention is useful for stacking successive sheets of various kinds of material, it is particularly advantageous for stacking successive sheets formed by severing a continuous sheet of chewing gum, a material which is particularly difficult to handle on account of its nature, because it is affected by local conditions such as changes in temperature, humidity and the like, and the difficulties in its handling vary with its condition.

My improved stacking mechanism as shown and described herein is particularly designed to replace the stacking mechanism shown and described in Patent No. 1,395,909 granted to C. E. Dellenbarger, Nov. 1, 1921.

One of the difficult problems in connection with the making of sheets of gum from a continuous strip is the collecting of the severed strips. A means for doing this is shown in the Dellenbarger patent above referred to but this means is rather complicated and comparatively slow, and, furthermore, does not stack the sheets with the accuracy desired and reverses every other sheet. If fresh sheets of gum are not stacked accurately but have their ends overlapping somewhat, the overlapping edges bend down and then harden in bent condition, with the result that the sheets become on that account imperfect and difficult to handle in subsequent operations. These subsequent operations require that the sheets and strips made therefrom shall be flat and this can best be attained by having the sheets accurately stacked so as to have no overhanging ends. The reversing of alternate sheets results in a change in color and forms frequent ridges or bucklings.

The following is a description of an embodiment of my invention, reference being had to the accompanying drawings, in which, Figure 1 is a side elevation of the delivery end of a sheet forming and delivering machine with my stacker connected thereto, at the forward or delivery end thereof;

Fig. 2 is a plan view of the same;

Fig. 3 is a side elevation of the stacker itself, part being broken away;

Fig. 4 is a sectional detail of a setting mechanism;

Fig. 8 is a section normal to the tray supports on the line 8—8, Fig. 3;

Fig. 9 is a sectional detail on the line 9—9, Fig. 7;

Fig. 10 is an enlarged view of the indexing shaft and parts carried thereby;

Fig. 11 is an enlarged view of the indexing wheel and pawl;

Fig. 12 is an enlarged view of the trip mechanism on the line 12—12, Fig. 10;

Fig. 13 is a sectional view showing the counting and indexing ratchets and pawl on the line 13—13, Fig. 10;

Figs. 14 and 15 are detail diagrammatic views of the counting and indexing ratchets and pawl.

Figure 5:
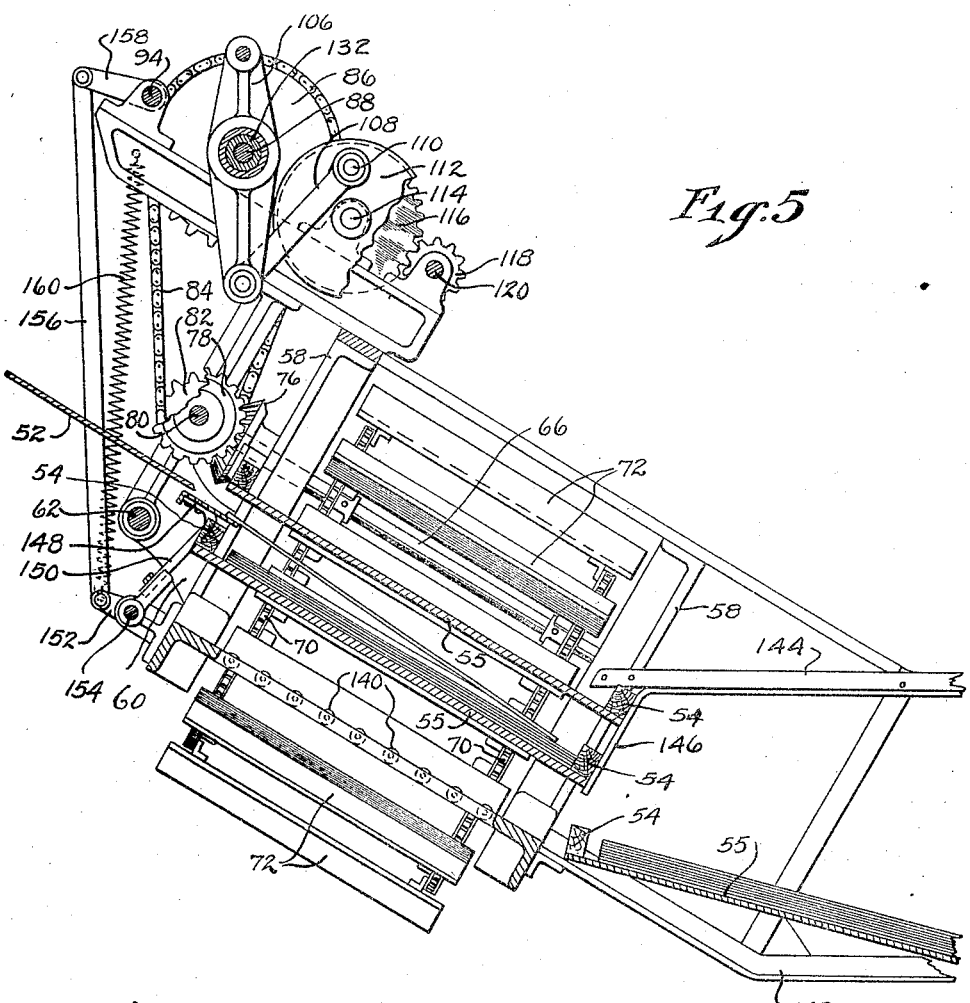
Fig. 5 is a medial section of the stacking mechanism on the vertical plane 5—5, Fig. 7.
Figure 6:
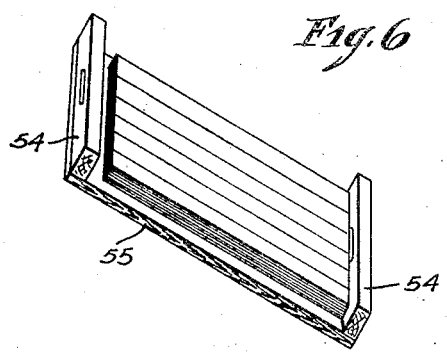
Fig. 6 is a perspective view of one of the trays.
Figure 7:
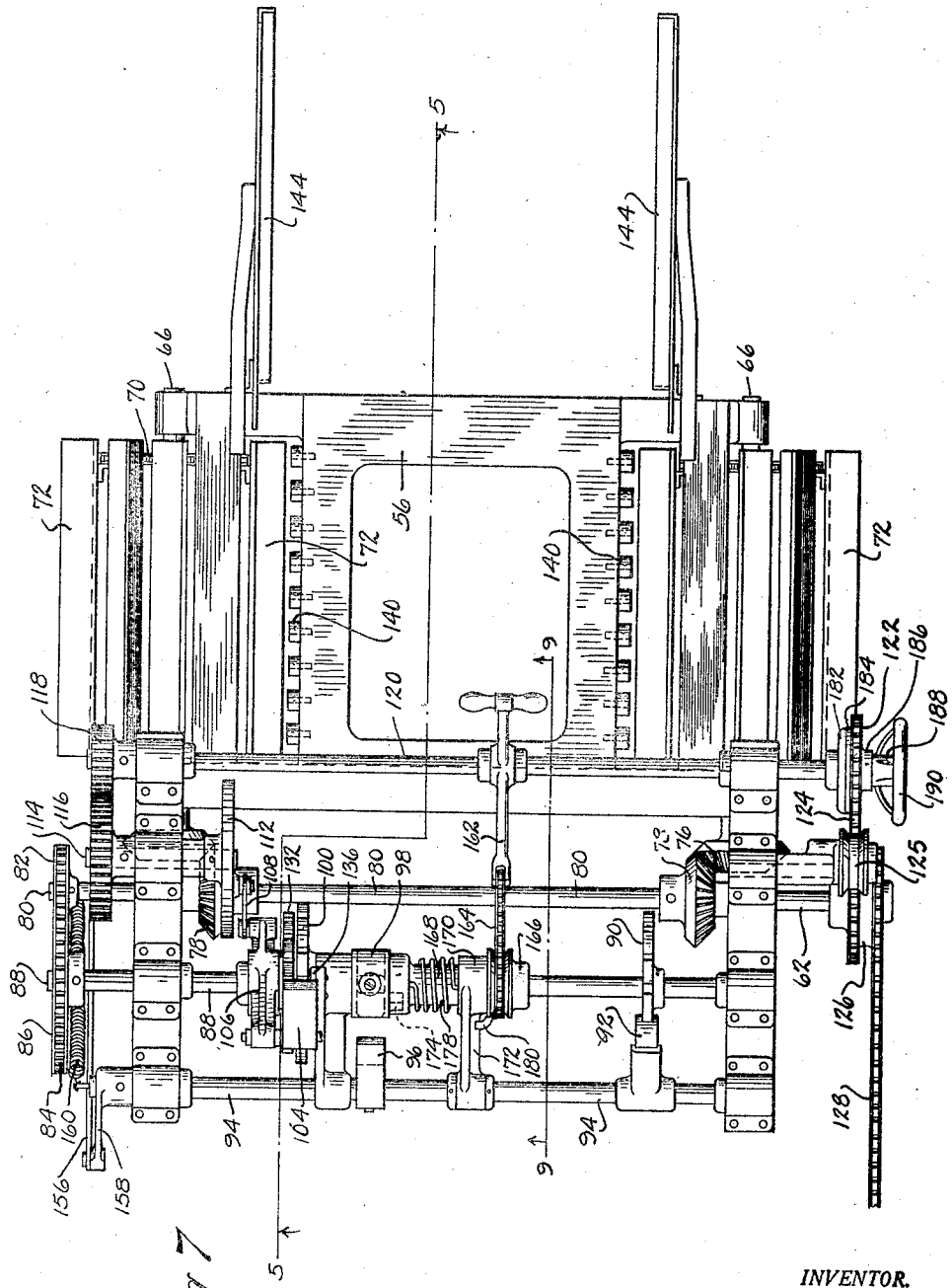
Fig. 7 is a plan view of the stacking mechanism.

Referring more particularly to the drawings, 2—2 are the side frames of the sheet gum forming mechanism carrying a continuous conveyor belt 4 mounted on drums 6 and 8 and driven by a sprocket 10 which is driven in timed relation with a pugging mill and initial forming rolls (not shown) which deliver a continuously and partially formed strip of gum to the conveyor 4. The conveyor 4 delivers this partially formed strip to a set of rolls 12—12 suitably adjusted so as to slightly further reduce the continuous strip delivered to them. These rolls discharge the strip across an inclined table 14 to a pair of rolls 16—16, the peripheral speed of which is slightly greater than the peripheral speed of the rolls 12—12 so as to account for the increase in length in the strip due to the action of the rolls 12—12 thereon. The rolls 12—12 are geared together and the rolls 16—16 are geared together and these two sets of rolls are connected by an idler 18. The shaft of the lower roll 16 is provided with a bevel gear 20 with which a bevel gear 22 engages, this bevel gear 22 being on a shaft 24 which is connected to a cone pulley 26 driven by a second cone pulley 28 which is driven through a coupling 30 from the preforming mechanism (not shown) above referred to. 32 is a belt upon cone pulleys 26 and 28. The belt 32 can be shifted to and fro by a belt guide 34 actuated by adjusting screws 36 which are connected by sprockets and chain and can be manually turned by a hand wheel 38 through gears 40 and 42. By this speed changing means the speed of the rolls 12—12 and 16—16 can be adjusted with reference to the speed of delivery of a sheet of gum from the conveyor 4.

The rollers 16—16 are for severing purposes and the upper roller carries a transverse knife 44 which acts to completely sever a portion of the continuous sheet upon every revolution of the knife. The rollers 16—16 deliver these successively severed sheets to the inclined table 46 and simultaneously with said severing the forward end of each severed sheet is engaged by rollers 48—48 driven by the sprocket chain 47 from the shaft of roll 16. The upper roll 48 carries circular scoring knives 50 which score the several strip longitudinally so as to produce weakened zones. In the apparatus shown there are seven such knives, the two outer knives being near the edges of the strip, which edges when removed constitute scrap. The rollers 48—48 deliver the severed and scored sheets to an inclined table 52 above the inclined plane of the ends 54 of a downwardly and forwardly inclined receiving tray 55. The rollers 48—48 move with a higher peripheral speed than the rollers 16 with the result that they separate the sheet between them for a considerable distance from the succeeding sheet, providing an interval necessary for the indexing hereafter referred to.

The receiving tray 55 constitutes a removable part of the stacking mechanism and is inclined downwardly and forwardly at such an angle that when a severed sheet of gum is delivered thereto from the inclined table 52 the sheet slides along the bottom of the tray or along a sheet already deposited therein, partly through its momentum and partly through the action of gravity, being slowed up by friction until it is stopped substantially by friction with its end closely adjacent to or in contact with the lower end of the tray and without hitting said lower end such a blow as to crumple or otherwise injure the sheet.

Conditions remaining the same, the stopping point of the delivered sheets is substantially constant. If, however, conditions vary on account of the delivery speed, temperature, humidity, amount of moisture in the gum, etc., or the amount of sugar on its surface, which varies the coefficient of friction, the normal stopping point of the severed sheets within the tray may vary slightly with a given inclination and it is therefore necessary to adjust the inclination of the tray to meet these conditions, so that the normal stopping point due to friction will be at substantially the inner face of the tray end.

The reception of the gum into a suitably inclined tray, is a remarkable advance over any means for receiving or stacking gum heretofore used since it enables the gum to be deposited in the tray at a greater speed and with greater accuracy than heretofore.

In my stacking mechanism, however, I not only use this inclined tray but provide means for removing a full tray and substituting an empty tray. I also provide means for doing this automatically without stopping or slowing down the sheet forming mechanism.

In order to provide means for removing a full tray and presenting an empty tray to the receiving position, I provide a tray carrier (shown in Figs. 3 to 12) comprising a frame having a base portion 56, and uprights 58 extending upwardly therefrom, said frame having lugs 60 pivotally mounted upon a fixed shaft 62 carried by the side frames 2. The free end of this frame member is adjusted vertically by means of a screw jack 64 whose lower end engages some suitable abutment such as the floor. The frame is thus angularly adjustable about the axis of the shaft 62 and since as hereafter pointed out the stacker mechanism is driven by a sprocket concentric with this axis the stacker can be angularly adjustable while in operation.

Mounted in bearings carried by the uprights 58 are four shafts 66 carrying eight keyed sprocket wheels 68 (Figs. 3 and 8). Upon these sprocket wheels are sprocket chains 70, having secured thereto at regular intervals angle irons 72 forming shelves for receiving the edges of the trays 55. The upper shafts 66 carry bevel gears 76 (Figs. 3 and 7) which are driven by bevel gears 78 mounted upon a shaft 80 which carries a sprocket wheel 82 and is driven through a sprocket chain 84 by a sprocket wheel 86 rigidly connected to a shaft 88 carrying an index wheel 90, which index wheel is controlled by a pawl 92 rigidly connected to a shaft 94 and actuated through an arm 96, rigidly secured thereto, by a cam or tooth 98 (Fig. 12), which is rigidly connected to a counting ratchet wheel 100 mounted upon a sleeve 102 which is free to turn upon the shaft 88.

The counting ratchet 100 (Figs. 7, 10 and 13) is actuated by a broad pawl 104 which is mounted upon the upper arm 106 of a lever fulcrumed about the axis of the shaft 88, the lower end of said lever having connected thereto a link 108 which is connected to a crank pin 110 upon a disk 112 which is mounted upon a shaft 114 journaled in the framework and carrying a gear 116. This gear 116 is driven by a gear 118 rigidly mounted upon a shaft 120 (Fig. 7), which shaft 120 is provided with a sprocket wheel 122 driven through the sprocket chain 124 by a double sprocket wheel 126 loosely mounted upon the shaft 62 before referred to. The sprocket chain 124 is held taut by a belt tightener 125. The sprocket wheel 126 is driven through the sprocket chain 128 by a sprocket 130 which is rigidly secured to the shaft of the lower roll 16 so as to be driven by the bevel gear 20.

The result of these connections is that the disk 112 is continuously revolved in the counterclockwise direction and the lever end 106 carrying the pawl 104 is constantly reciprocated, causing the counting ratchet 100 to advance periodically one step at a time and to cause the tooth 98 Fig. 12 to periodically engage the lever 96 and thus periodically withdraw the stop 92 from a notch in the index wheel 90.

During the time that the stop 92 is withdrawn from a slot in the index wheel 90 the change in the position of the trays takes place. This is brought about through the indexing ratchet 132 (Figs. 7 and 10) which is carried by the shaft 88, being rigidly secured thereto, by the action of the broad pawl 104 thereon. This pawl 104 actuated by spring 105 engages the teeth upon the counting ratchet 100 upon each reciprocation. These teeth, however, with the exception of the tooth 134, are so shallow that they do not permit the pawl 104 to engage the tooth of the counting ratchet 132 (Fig. 13). The tooth 134, however, is so deep that the pawl 104 when in full engagement therewith (Fig. 15) also engages a tooth upon the indexing ratchet 132. It is necessary, however, to have the index wheel 90 unlocked by the withdrawal of the pawl 92 before the counting ratchet is moved and for that purpose there is provided a stationary cam 136 carried by a yoke 138 surrounding both shafts 88 and 94 which holds the pawl 104 out of engagement with the counting ratchet 132 (Fig. 14) during the first half of the stroke of the pawl 104 without interfering with its engagement with a portion of the deep tooth 134. The result is that the counting ratchet, together with the tooth 98, is moved during the first half of that movement of the pawl 104. The tooth 134 is not only deeper but is slightly longer circumferentially than the other connecting teeth so that the movement of the connecting ratchet and its shaft through the tooth 134 begins earlier than at other times. The cam 98 (Figs. 10 and 12) is so adjusted with reference to the tooth 134 that during the first half movement referred to it engages and lifts the lever 96 so as to retract the stop 92 from the index wheel 90. After this movement of retraction, the pawl 134 has passed the stationary cam 136 and is therefore permitted to engage the indexing wheel (Fig. 15) which is then free to rotate and is rotated by the continued action of the pawl 104, the movement being transmitted through the sprocket wheel 86, chain 84, sprocket 82 and bevel gears 78 to the bevel gears 76, resulting in the movement of the inner shelves 72 downward from one position to the next.

The lower tray 55 shown in Fig. 8 represents a tray in the receiving position and the upper tray represents a reserve tray in advance of receiving position. When this indexing action takes place the lower tray is moved downward until it rests upon rollers 140 carried by the framework, which, being in an inclined series, permits the tray to automatically roll out on to the horizontal supports 142. The same action of the indexing device properly places the next succeeding or reserve tray in receiving position. The operator then inserts a new reserve tray upon the shelves in advance of the receiving tray. 144 are horizontal rests upon which this new tray can be supported before it is moved by the operator on to the shelves 72 ready to receive it.

The stop 146 (Fig. 5) carried by the support 144 acts to hold the receiving and reserve trays in position on the shelves against the action of gravity until the lowermost tray, after an indexing movement, escapes the same so as to be free to slide out under the action of gravity.

When the tray positioning mechanism is entirely automatic as above described, the inclined table 52 from which the sheets are discharged into a tray does not extend under the end of the reserve tray so as to interfere with the movement of the reserve tray in a direction normal to its plane. It is desirable, however, to have the end of the receiving tray beneath the delivery table and this may be accomplished either by shoving the tray backward manually so that it is beneath the end of the table, or providing a supplemental table which shall move forward over the end of the tray after the indexing has taken place and be withdrawn before the indexing action begins. 148 is such an auxiliary table (Fig. 5). This is carried by rocker arms 150 adapted to pass on each side of a tray and actuated by a lever 152 rigidly mounted upon a shaft 154. The free end of the lever 152 is actuated by a link 156 connected to a lever arm 158 which is secured to the shaft 94 so that when the index wheel is released the auxiliary table is retracted and when the indexing is completed and the indexing wheel is in locked position the auxiliary table extends over the end of the tray as shown in Fig. 5.

160 is a tension spring acting to move the auxiliary table into normal position and also tending to move the stop 92 into engagement with a tooth in the indexing wheel 90.

It sometimes happens that an imperfect sheet is delivered to a tray or that a sheet is interfered with so as to become crumpled as it is delivered into the tray. It then becomes desirable to remove the receiving tray from receiving position and substitute the reserve tray at once so as not to permit sheets to pile upon the imperfect sheet. In order to secure this result I provide a manually operated bell crank lever 162 loosely mounted upon the shaft 120 (Figs. 7 and 9), the free end of which is connected to a chain 164, one end of which is secured to a sleeve 166. This sleeve, as shown in Fig. 10, is secured to a hollow shaft 168 journaled in a bearing 170 carried by a fixed arm having a stop flange 172. This hollow shaft 168 has upon its righthand end a tooth 174 (Fig. 12) which is adapted to engage a spring pawl 176 carried by the tooth 98 and held by spring 177. The hollow shaft 168 is also provided with a retracting spring 178 one end of which is secured to the shaft while the other end is secured to the fixed bearing 170 (Fig. 10). The sleeve 166 is provided with a lug 180 (Figs. 7 and 10) which is normally held against the upper face of the flange 172 by the action of the spring 178. When the manual lever 162 is actuated, the stop 180 is revolved until it reaches the under side of the stop flange 172. In the course of this movement the tooth 174 engages the face of the pawl 176 (Fig. 12) and causes it to carry the cam tooth 98 and counting cam 100 around so that at the very next indexing period of the machine the cam tooth 98 engages the lever 96, causing the indexing operation heretofore described.

In order that the indexing shall take place during the interval between the depositing of one sheet and the approach of the succeeding sheet to the receiving tray, it is necessary to set the mechanism of the stacking device so that the indexing ratchet will be actuated after one sheet has been deposited and before the forward end of the next sheet which, as stated above, is separated for a considerable distance from the rear end of the preceding sheet, has been brought into alinement with the rear end of the tray. This setting is accomplished by adjusting the sprocket wheel 122 relatively to its shaft. In order to permit of this adjustment I provide the shaft with a fixed flange member 182 (Figs. 4 and 7) upon which is a friction washer 184 which bears against one face of the sprocket 122, the sprocket being carried by a sleeve 186 which is free to turn upon its shaft. The shaft 120 is screw-threaded at its end and provided with a nut 188 to which is connected a hand wheel 190 so that it can be easily turned. In this way the angular position of the sprocket 122 relatively to the shaft 120 can be adjusted as required and securely clamped to the flange 182 so that the indexing of the trays will take place at the proper time relatively to the delivery of the sheets thereto.

The upper rolls 12, 16 and 48 are independently adjusted by hand wheels 192, 194 and 196, respectively.

When the machine is properly adjusted and a continuous sheet of gum is being formed and supplied to the severing rolls 16—16, the knives of the upper roll 16 severs successive sheets of gum each of which as it is severed, is then seized by the scoring rolls 48—48 and dragged ahead of the succeeding sheet so as to form a space of three or four inches and delivered to a receiving tray 55. In normal operation each tray receives twelve sheets, there being six teeth upon the counting ratchet, and there being one movement of that ratchet for every two sheets. When the twelve sheets have been delivered the cam tooth 98 engages the lever 96 and releases the index wheel 90 so as to permit the continued movement of the pawl 104 to move the indexing ratchet 132 and thus cause the reserve tray to be substituted for the tray previously in receiving position. The full tray is then removed by the operator, or runs out upon the supports 122 and a fresh tray previously carried on the supports 124 is moved into the reserve position. The action of the machine, therefore, is automatic except for the final removal of full trays and the placing of the reserve trays.

As before stated, if it is desired to advance the exchange of trays this can be done by the manual operation of the lever 162.

As will be evident to those skilled in the art, my invention permits of various modifications without departing from the spirit thereof or the scope of the appended claims.

What I claim is:

1. In a machine for handling sheets of gum, the combination of means for delivering severed sheets of gum, comprising a forwardly and downwardly inclined delivery table, and means for receiving said severed sheets comprising a forwardly and downwardly inclined tray, the angle of inclination being such that the sheet will be substantially stopped by friction at the desired point.

2. In a machine for handling sheets of gum, the combination of means for delivering severed sheets of gum, and means for receiving said severed sheets comprising a forwardly and downwardly inclined tray, the angle of inclination being such that the sheet will be substantially stopped by friction at the desired point, said machine having means for delivering said sheets to said tray in a downwardly and forwardly inclined direction.

3. In a machine for handling gum, the combination of means for delivering severed sheets of gum, and means for receiving said severed sheets comprising a forwardly and downwardly inclined tray, said machine having means for separating a severed sheet for a considerable distance from a succeeding sheet, and means for automatically removing a filled tray from receiving position and substituting a fresh tray.

4. In a machine for handling gum, the combination of means for delivering severed sheets of gum, and means for receiving said severed sheets comprising a forwardly and downwardly inclined tray, said machine having means for separating a severed sheet for a considerable distance from a succeeding sheet, and means for automatically removing a filled tray from receiving position and substituting a fresh tray, and means for manually advancing the action of said automatic means.

5. In a machine for handling gum, the combination of means for delivering severed sheets of gum, and means for receiving said severed sheets comprising a forwardly and downwardly inclined tray, said machine having means for separating a severed sheet for a considerable distance from a succeeding sheet, and means for automatically removing a filled tray from receiving position and substituting a fresh tray, said automatic means comprising a counting ratchet, an indexing ratchet, and a common pawl, the teeth of indexing ratchet being a multiple of the teeth of said counting ratchet, said counting ratchet having teeth holding said pawl out of engagement with said indexing ratchet and at least one tooth permitting said pawl to engage both said counting ratchet and indexing ratchet, and means for holding said pawl while in engagement with said counting ratchet tooth out of engagement with said registering ratchet during the first part of the movement of said counting ratchet.

6. In a stacking device, the combination of a plurality of endless chains, a series of supports carried by said chains in spaced relation to one another, means for automatically moving said chains step by step at predetermined intervals, trays supported by said supports, and framework carrying sprocket wheels supporting said chains, said supports and trays being downwardly inclined, and said chains being in planes normal to the inclined planes of said supports.

7. In a stocking device, the combination of a plurality of endless chains, a series of supports carried by said chains in spaced relation to one another, means for automatically moving said chains step by step at predetermined intervals, trays supported by said supports, and framework carrying sprocket wheels supporting said chains, said framework having antifriction devices engaging the bottom of a tray in its lowermost position, said supports and trays being downwardly inclined and said chains being in planes normal to the inclined planes of said supports.

8. The combination of a machine adapted to form and deliver separated sheets, means for supporting a series of downwardly and forwardly inclined trays spaced apart one above the other, one of said trays being in receiving position, means for automatically removing said last-mentioned tray from receiving position and substituting a reserve tray, and a supplemental table normally extending over the end of the receiving tray, and means for automatically removing said table prior to the substitution of a reserve tray and restoring it after such substitution.

9. In an automatic gum handling machine a stacking device comprising a shaft having an index wheel thereon, a shaft parallel thereto having a stop for engaging said index wheel, a counting ratchet loosely mounted on said shaft, and an indexing ratchet fixed upon said shaft, a lever mounted on said shaft carrying a pawl adapted to engage the teeth of said counting ratchet and to periodically engage a tooth of said indexing ratchet, said counting ratchet having a tooth controlling the engagement of said pawl with said indexing ratchet, and a fixed cam also controlling the action of said pawl upon said counting ratchet.

10. In an automatic gum handling machine a stacking device comprising a shaft having an index wheel thereon, a shaft parallel thereto having a stop for engaging said index wheel, a counting ratchet loosely mounted on said first shaft, and an indexing ratchet fixed upon said first shaft, a lever mounted on said first shaft carrying a pawl adapted to engage the teeth of said counting ratchet and to periodically engage a tooth on said indexing ratchet, the teeth of said counting ratchet controlling the engagement of said pawl with said indexing ratchet, and a fixed cam also controlling the action of said pawl on said indexing ratchet, and spring retracted means for advancing said counting ratchet as desired, said counting ratchet having connected thereto a cam acting to release said stop from said index wheel.

11. In a machine for handling sheets, the combination of means for delivering severed sheets, and means for receiving said severed sheets comprising a forwardly and downwardly inclined tray, the angle of inclination being such that the sheet will be substantially stopped by friction at the desired point, and means for angularly adjusting said receiving means and tray for varying conditions of the sheets delivered thereto.

12. In a machine for handling sheets, the combination of means for delivering severed sheets, and means for receiving said severed sheets comprising a forwardly and downwardly inclined tray, the angle of inclination being such that the sheet will be substantially stopped by friction at the desired point, said machine having means for delivering said sheets to said tray in a downwardly and forwardly inclined direction, and means for angularly adjusting said receiving means and tray, for varying conditions of the sheets delivered thereto.

13. In a machine for producing successive sheets and stacking the same, means for severing a continuous web so as to form successive sheets, means for delivering said sheets in a downwardly and forwardly inclined plane, a downwardly and forwardly inclined tray which is adapted to receive the delivered sheets, the inclination of the tray being such as to cause the delivered sheets to stop by friction at the desired point.

14. In a machine for producing successive sheets and stacking the same, means for severing a continuous web so as to form successive sheets, means for speeding up the movement of the sheets when severed, means for delivering said sheets in a downwardly and forwardly inclined plane, a downwardly and forwardly inclined tray which is adapted to receive the delivered sheets, the inclination of the tray being such as to cause the delivered sheets to stop by friction at the desired point, means for automatically removing a filled tray after a predetermined number of sheets have been deposited therein and, during the interval of separation between successive sheets, alining a fresh tray.

15. In a machine for producing and stacking successive sheets, means for severing a web into a series of successive sheets, means for supporting a series of trays in a downwardly and forwardly inclined position, means for moving said series step by step in a direction normal to the planes of said trays, and means for actuating said tray moving means periodically after the delivery of a predetermined number of sheets.

16. In a machine for producing and stacking successive sheets, means for severing a web into a series of successive sheets, means for supporting a series of trays in a downwardly and forwardly inclined position, means for moving said series step by step in a direction normal to the planes of said trays, means for actuating said tray moving means periodically after the delivery of a predetermined number of sheets, and manual means for advancing the time of action of said tray moving means.

17. In a stacking device means for supporting a series of trays, means for delivering sheets to one of said trays, a sheet counting ratchet wheel, a tray indexing ratchet wheel, a pawl acting on both of said ratchet wheels, said counting ratchet wheel controlling the engagement of said pawl with said indexing ratchet wheel.

18. In a stacking device movable means for supporting a series of trays, means for delivering sheets to one of said trays, a sheet counting ratchet wheel, a tray indexing ratchet wheel, a pawl acting on both of said ratchet wheels, said counting ratchet wheel controlling the engagement of said pawl with said indexing ratchet wheel, a cam delaying the engagement of said pawl with said indexing ratchet wheel when said counting ratchet does not prevent such engagement, a lock normally locking said tray supporting means and actuated by said counting ratchet wheel, said counting ratchet wheel withdrawing said lock while said ratchet wheel pawl is in engagement with said delaying cam.

19. In a machine for handling sheets the combination of means for delivering severed sheets, and means for receiving said severed sheets comprising a forwardly and downwardly inclined tray, and means for angularly adjusting said tray for varying conditions of the sheets delivered thereto.

20. In a machine for handling sheets the combination of means for delivering severed sheets, and means for receiving said severed sheets comprising a forwardly and downwardly inclined tray, said machine having means for delivering said sheets to said tray in a downwardly and forwardly inclined direction, and means for angularly adjusting said tray for varying conditions of the sheets delivered thereto.

In testimony whereof, I have signed my name to this specification this 27th day of June, 1925.

BENJAMIN S. PENLEY.